United States Patent [19]

Bennett et al.

[11] 3,792,448

[45] Feb. 12, 1974

[54] FAILSOFT PERIPHERAL EXCHANGE

[75] Inventors: Walter Scott Bennett, Diamond Bar; Jacob Frank Vigil, Sierra Madre, both of Calif.

[73] Assignee: Burroughs Corporation, Detroit, Mich.

[22] Filed: May 21, 1973

[21] Appl. No.: 362,249

[52] U.S. Cl. .............................................. 340/172.5
[51] Int. Cl. ........................ G05b 19/00, H04q 3/00
[58] Field of Search .................................. 340/172.5

[56] References Cited

UNITED STATES PATENTS

| | | | |
|---|---|---|---|
| 3,421,150 | 1/1969 | Ouosig et al. | 340/172.5 |
| 3,400,373 | 9/1968 | Nicholson | 340/172.5 |
| 3,593,302 | 7/1971 | Saito et al. | 340/172.5 |
| 3,573,741 | 4/1971 | Gavril | 340/172.5 |

*Primary Examiner*—Paul J. Henon
*Assistant Examiner*—Paul R. Woods
*Attorney, Agent, or Firm*—Albin H. Gess; Benjamin F. Spencer; Edward G. Fiorito

[57] ABSTRACT

In a computer system, use of two or more I/O exchanges between peripheral controllers and serial peripheral units, such as disk files, disk packs and tape drives, provides redundant communication paths that can be made available for communication between the N controllers and the M peripheral units. All peripheral controllers and units are connected to each exchange. Each controller and unit may be manually assigned to a certain exchange. In the case of two exchanges, if a certain one fails due to loss of power, all peripheral units are automatically assigned to the other exchange.

17 Claims, 2 Drawing Figures

FAILSOFT PERIPHERAL EXCHANGE

BACKGROUND OF THE INVENTION

The present invention relates generally to improvements in computer system communication networks and more particularly pertains to a new and improved peripheral communication network wherein redundant input/output exchanges are used for regulating communication between peripheral controllers and peripheral units.

One of the most critical problems that is continually confronting the designers of computer communication networks has been the provision of systems that can tolerate partial hardware failure, that is, continuing to function fully, although perhaps at a somewhat degraded efficiency, in spite of some hardware failure. The prior art has attacked this problem at various levels and with various degrees of intensity. For example, computer controlled communication networks have been designed wherein the failure of a certain data storage unit triggers another storage unit to assume the function of the failed one, this being accomplished under computer control. To reasonably ensure that this function will occur, the controlling computer must also be protected against failure by making another computer available to take over its function when the primary computer fails.

As central data processing systems grew in size and in speed, their capability for handling an increased number of peripheral units also grew. The communication link between the central processor and a multitude of peripheral units has, therefore, become more critical. The safeguarding of these communication links, however, was not readily attainable by prior art techniques because of the high cost involved in providing redundant computers for controlling communication between peripheral units and the central processing system.

In instances where the prior art has not utilized redundant computers for controlling communication between peripheral units and the central processor, an input/output exchange was normally used to connect a plurality of peripheral units to the central processing system. Obviously, if this input/output exchange failed, all the peripheral units connected to that exchange would have their access path to the central processing system blocked.

SUMMARY OF THE INVENTION

It is therefore an object of this invention to provide redundant paths of communication between peripheral controllers and peripheral units.

Another object is to provide for automatic reassignment of certain peripheral controllers and peripheral units when the input/output exchange to which they are assigned has a power failure.

Still another object is to provide for manual assignment of the peripheral controllers and peripheral units to the input/output exchanges.

The foregoing objects and the general purpose of the invention are accomplished by providing at least one additional $N \times M$ input/output exchange, to which all the peripheral controllers and peripheral units are connected. A 1×2 exchange is provided at each peripheral controller and peripheral unit when two input/output exchanges are used. A system control unit is connected for controlling at least one of the input/output exchanges.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof and wherein.

DESCRIPTION OF THE PREFERRED EMBODIMENT

Figure 1:
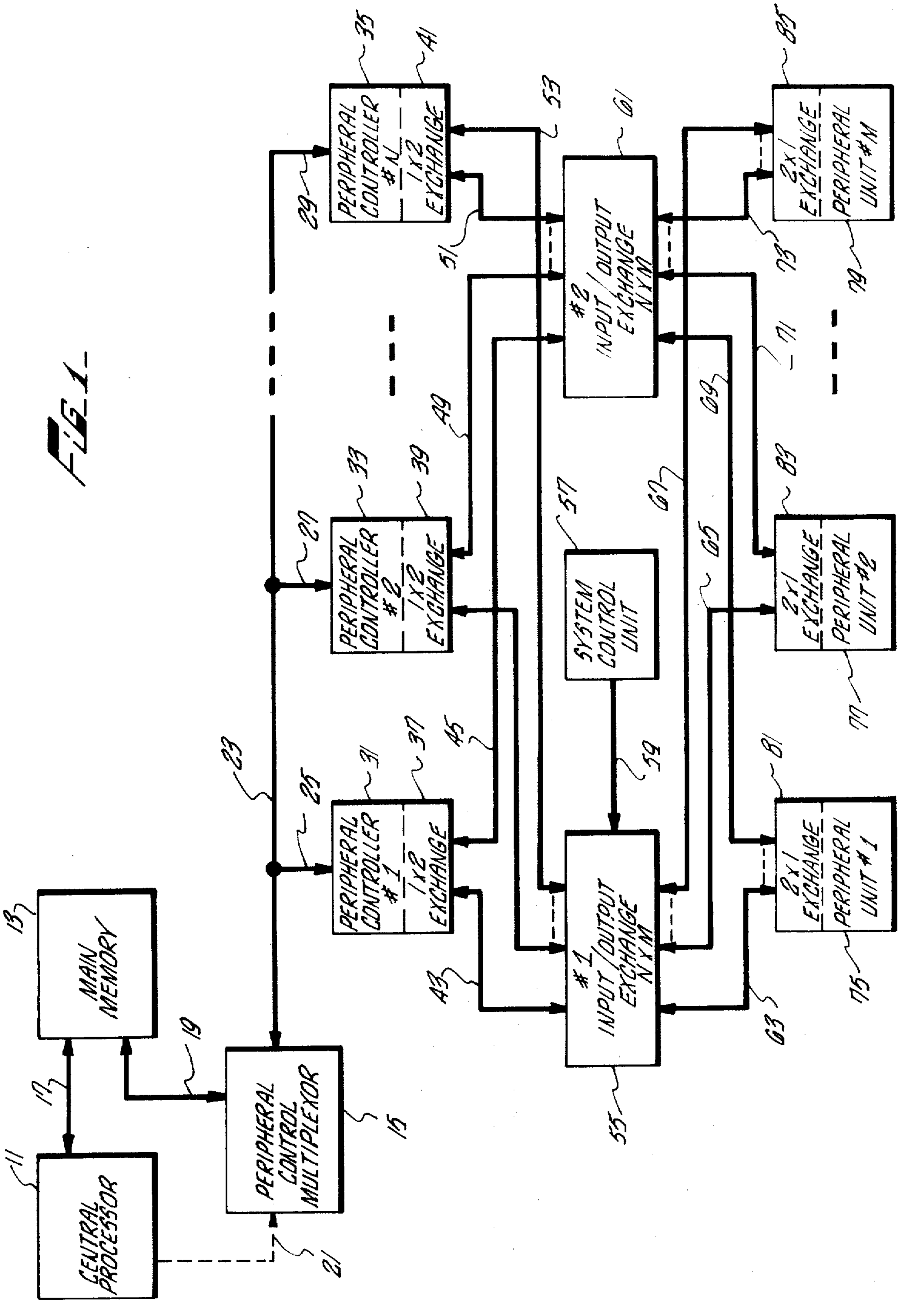
FIG. 1 shows in block diagram form a peripheral communication network connected to a central processing system.

FIG. 1, which illustrates the presently preferred embodiment of a peripheral communication network connected to a central processing system, shows a plurality of peripheral controllers 31, 33, 35 communicating with a plurality of peripheral units, 75, 77, 79 through a pair of input/output exchanges 55, 61. Number 1 peripheral controller 31 communicates with the central data processing system which is made up of a central processor 11 and a main memory 13 through a peripheral control multiplexor 15. Number 2 peripheral controller 33 as well as number N peripheral controller 35, like all the peripheral controllers, communicates with the central processing system through the peripheral control multiplexor 15 over their individual conduits 25, 27, 29, and a main conduit 23. It should be understood that the term conduit refers to a multiple path bus or a multiple cable link wherein each cable is made up of a plurality of individual conductors. The peripheral controllers in the figure have been illustrated as an indeterminate number since their exact number is a matter of design choice.

Specific structure and a functional description of the concept of a plurality of peripheral controllers communicating with a central processing system through a peripheral control multiplexor is fully set forth in a patent issued to E. A. Hauck, for an "Input/Output Control for a Digital Computing System," having U.S. Pat. No. 3,408,632, and assigned to the assignee of this invention. The disclosure of this patent is fully incorporated herein by reference.

Each peripheral controller 31, 33, 35 communicates with a plurality of peripheral units 75, 77, 79 through either one of two input/output exchanges 55, 61. Number 1 peripheral controller 31 communicates with number 1 input/output exchange 55, for example, over conduit 43 and communicates with number 2 input/output exchange 61 over conduit 45. Conduits 43 and 45 are connected to the number 1 peripheral controller 31 by way of a 1×2 exchange 37 which will be hereinafter more fully described. Number 2 peripheral controller 33, likewise, has a 1×2 exchange 39. Conduits 47 and 49 connect this exchange to the number 1 input/output exchange 55 and the number 2 input/output exchange 61, respectively. Similarly, number $N$ peripheral controller 35 has a 1×2 exchange 41 which connects the peripheral controller to the number 1 input/output exchange 55 and the number 2 input/output exchange 61 by way of conduits 53 and 51 respectively. All the peripheral controllers 31, 33, 35 can be assumed to be similarly structured. All the 1×2 exchanges 37, 39, 41 are also similarly structured.

The number 1 input/output exchange 55 and the number 2 input/output exchange 61 are identically structured, except for the differences relating to the present invention. These differences will be hereinafter enumerated, in connection with FIG. 2. Specific structure and a function explanation of an input/output exchange that may be used with the present invention are fully set forth in a patent granted to D. N. MacDonald et al for "Data Processing System" having U.S. Pat. No. 3,200,380. The material in that patent relating to the input/output exchange is fully incorporated herein by reference. It should be understood that the inventive concept here does not limit itself to the use of only two input/output exchanges since it may be expanded to any number. A two exchange system has been chosen as an example for the sake of simplicity to facilitate comprehension of the invention.

A system control unit 57 is connected to a selected input/output exchange, in this case, to number 1 input-/output exchange 55 over conduit 59, as will be hereinafter explained. This system control unit facilitates the manual assignment of peripheral controllers and peripheral units to either number 1 input/output exchange 55 or number 2 input/output exchange 61. The input/output exchanges are denoted *N* × *M* exchanges because they can conceivably connect any number *N* of peripheral controllers to any number *M* of peripheral units.

Each peripheral unit communicates with a certain peripheral controller through its assigned input/output exchange as determined by the system control unit 57. Number 1 peripheral unit 75 which may be a disk file, disk pack, tape drive, teletype, printer, card reader, card punch, keyboard, etc., is connected to number 1 input/output exchange 55 and number 2 input/output exchange 61 by way of conduits 63 and 69 through its 2×1 exchange 81. Number 2 peripheral unit 77 likewise is connected to number 1 input/output exchange 55 and number 2 input/output exchange 61 over conduit 65 and 71 through its 2×1 exchange 83. Number M peripheral unit 79 is connected to number 1 input-/output exchange 55 and number 2 input/output exchange 61 over conduits 67 and 73, respectively, through its 2×1 exchange 85.

These 2×1 exchanges 81, 83, 85 are similarly structured since all the peripheral units mentioned are the type that receive data serially rather than in parallel. As is obvious from the figure, the number of peripheral units utilized is a matter of design choice. The specific structure and function of the 2×1 exchanges 81, 83, 85 as it relates to the invention will be hereinafter explained in connection with FIG. 2. Suffice it to say for the present each peripheral unit has a redundant path to its peripheral controller through a pair of input/output exchanges 55, 61.

Figure 2:
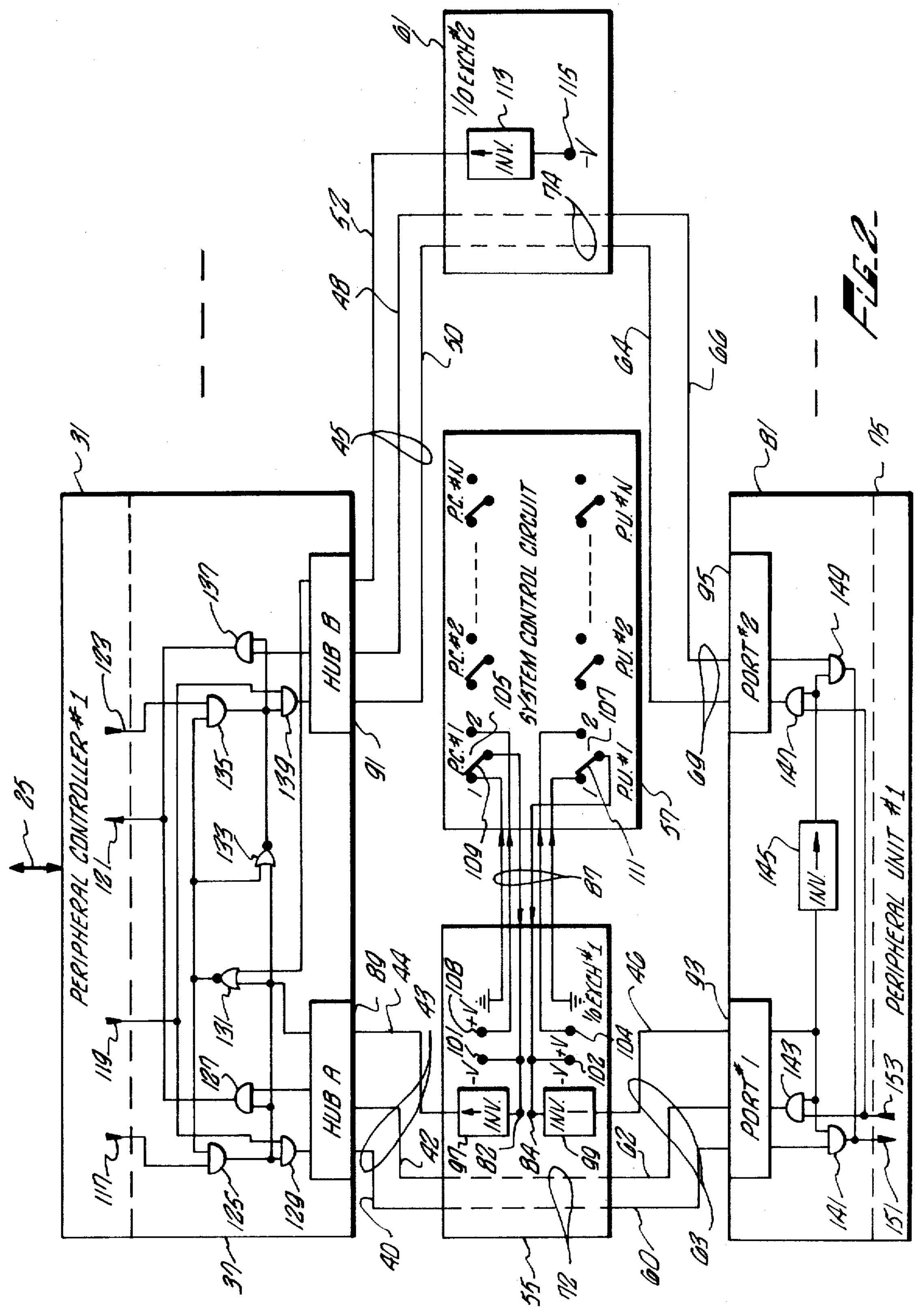
FIG. 2 shows the preferred logic circuitry utilized in various functional blocks of FIG. 1.

Referring now to FIG. 2, which illustrates a preferred arrangement of circuitry and hardware in one peripheral controller, and one peripheral unit, the logic circuitry in each input/output exchange that enables a particular peripheral controller to communicate with a particular peripheral unit through one exchange or the other is also shown. FIG. 2 only illustrates the connection of one peripheral controller to one peripheral unit for the sake of simplifying the explanation and to facilitate comprehension of the invention.

Number 1 peripheral controller 31 receives control and data signals from the peripheral control multiplexor 15 (FIG. 1) over conduit 25 in a manner described in the E. A. Hauck U.S. Pat. No. 3,408,632. The structure of the peripheral controller, as explained in the Hauck patent, generates certain control signals on lines 117 and 123 and receives and transmits data signals on lines 121 and 119. These lines are connected to a 1×2 exchange 37 which connects the number 1 peripheral controller 31 to both the number 1 input-/output exchange 55 and the number 2 input/output exchange 61.

The 1×2 exchange 37 is made up of three AND gates per hub and a pair of interconnecting NOR gates 131, 133. AND gates 125, 127, and 129 are dedicated to A hub 89 and AND gates 135, 137, 139 are dedicated to B hub 91. The hubs are simply pluggable interconnections between the 1x2 exchange 37 and their respective conduits 43, 45.

Each conduit is made up of a plurality of cables. Conduit 43, for example, is made up of cables 40 and 42. Conduit 45 is made up of cables 48 and 50. Each cable, such as cables 42 and 40 are made up of a plurality of single conductors whereas lines 44 and 52 are single conductors. Cables 40 and 42 are similar to cables 48 and 50. They carry the data and control signals from the peripheral controller to the I/O exchanges. It should be understood that the many other conductors making up cables 40, 42, 48 and 50 are not illustrated since they are not relevant to the present invention. The various clocking and other control signals carried on these lines that are part of an operating system are seen as well within the purview of a person of ordinary skill in the art and therefore are not further considered, herein.

Each input/output exchange, such as exchange 55 for example, receives data control cables, such as 40 and 42, and in response to control signals on those cables transfers the data to the peripheral unit indicated by the control signals. This function is illustrated by dashed lines 72 within the I/O exchange 55 and is well set forth structurally and functionally in the patent to D. N. MacDonald et al., U.S. Pat. No. 3,200,380. It should be remembered that each input/output exchange is connected to all the peripheral units and that for ease of explanation only one peripheral unit is illustrated in FIG. 2. The addition of more peripheral units merely duplicates the circuitry shown in the I/O exchange for the one peripheral unit.

Assuming that data is to be communicated to number 1 peripheral unit 75, control and data signals are transferred to peripheral unit 75 over conduit 63 which carries control and data signals in cables 60 and 62 and a port select signal on line 46. If number 1 peripheral controller 31 was to communicate with number 1 peripheral unit 75 through B hub 91, data and control signals would be transferred to number 2 input/output exchange 61 over the data and control cables 48, 50. The peripheral unit would be selected in the I/O exchange as indicated generally by the dashed lines 74. The commensurate control and data signals are then transferred to number 1 peripheral unit 75 over conduit 69 which has data and control signal lines 64, 66. This conduit is connected to the number 2 port 95 of number 1 peripheral unit 75.

The 2×1 exchange 81 of number 1 peripheral unit 75 consists of a pair of AND gates for each port. AND gates 141, 143 are assigned to number 1 port 93, and AND gates 149, 147 are assigned to number 2 port 95. The two ports are coupled by a logic inverter 145. Lines 151 and 153 are data transfer lines from the exchange 81 to the peripheral unit 75. Obviously, the control lines coming in on cables 60, 62, 64, and 66 to the two ports 93, 95 are not shown herein since they are not a part of this invention. Although, they are a part of an operating system. The function and sequence of the control signals to peripheral units is seen as well within the purview of a person of ordinary skill in the art and therefore, not further discussed herein.

A system control unit 57 is connected to one input/output exchange 55 by way of a cable 87. This cable 87 has conductors therein connecting the wiper and contact points of the switches in the system control unit to sources of minus voltage 101, 102, sources of plus voltage 103, 104, and 0, or ground voltage.

Again for the sake of simplicity of explanation only one set of swtiches has been shown connected to these voltage sources in number 1 I/O exchange 55. Peripheral control 1, switch 105, and peripheral unit 1, switch 107, are shown as being connected. It should be understood, however, that each peripheral controller and each peripheral unit has its own switch and related circuitry similar to that shown in FIG. 2 for number 1 peripheral controller 31 and number 1 peripheral unit 75. Besides the voltages sources, number 1 I/O exchange 55 has a pair of logic inverters 97 and 99 that are respectively generating signals over lines 44 and 46. The signal on line 44 represents an exchange inhibit level. The signal on line 46 represents a port select level.

Number 2 I/O exchange 61 also has additional circuitry related to the invention comprising a negative voltage source 115 connected to a logic inverter 113 which generates a signal on line 52 that is supplied to the 1×2 exchange 37 through B hub 91. This signal is also an exchange inhibit level.

By this arrangement and interconnection, the switches, that is switches 105 and 107, will determine by their setting through what input/output exchange a peripheral controller, such as number 1 peripheral controller 31, and a peripheral unit, such as number 1 peripheral unit 75, will communicate with each other. As an example, assuming that the wiper 109 of switch 105 is set to the 1 contact position, a low is placed at point 82 at the input of logic inverter 97, since the minus voltage 101 is connected to ground. A low at point 82 will cause logic inverter 97 to place a high on line 44 thereby supplying a high to the inputs of NOR gates 131, 133, and AND gates 127, and 129. Assuming also that minus voltage source 115 in number 2 input/output exchange 61 is operating causing the logic inverter 113 to place a high on line 52, a high will be supplied to the other input of NOR gate 131. The output of NOR gate 131 will thus be a low since both its inputs are high causing a low to be placed at one of the inputs of AND gate 125, at the other input of NOR gate 133 and one of the inputs of AND gate 135. Since the inputs to NOR gate 133 are one high and one low its output will also be low placing a low at one of the inputs of AND gate 139 and at one of the inputs of AND gate 137, thereby disabling B hub 91. A hub 89, on the other hand, is enabled by the high received on line 44. The peripheral unit, therefore, can communicate with a peripheral controller only through the number 1 input/output exchange 55.

Assuming now that wiper 109 of peripheral controller switch 105 is moved to the 2 contact position, it can be seen that a high will be placed at point 82, at the input of logic inverter 97, since a positive voltage 103 is now connected to the negative voltage 101. This will cause a low to be placed on exchange inhibit line 44, causing a low to be supplied to one of the inputs of NOR gate 131 and to AND gates 127 and 129. A low will also be supplied to one of the inputs of NOR gate 133. Assuming again, that a high is coming in on line 52 from number 2 I/O exchange 61, a high will be supplied to the other input of NOR gate 131, thereby causing NOR gate 131 to generate a low. As a result, a low is placed on the other input to NOR gate 133 and to one input of AND gate 125 and one input of AND gate 135. The output of NOR gate 133, because both its inputs are low, is a high which enables AND gate 139 and 137. Thus, it can be seen, that A hub 89 is disabled and B hub 91 is enabled. The number 1 peripheral controller 34 can therefore, communicate with the number 1 peripheral unit 35 only through the number 2 input/output exchange 61.

Referring now to peripheral unit 1 switch 107 and assuming that the switch wiper 111 is in the number 1 contact position, as shown in the figure, it can be seen that point 84 at the input of logic inverter 99 would be a low since the minus voltage 102 is connected to ground. The logic inverter would, in response, place a high on port select line 46 which would cause a high to be placed at one of the inputs of AND gates 143 and 141 and a low, because of logic inverter 145, to be placed at one of the inputs of AND gates 149 and 147. As can be seen, this combination of levels inhibits number 2 port 85 and enables number 1 port 93.

Assuming now that wiper 111 of switch 107 is placed in the number 2 contact position, a high will be placed at point 84, the input of logic inverter 99, since the positive voltage source 104 is connected to the negative voltage source 102. This will place a low on port select line 46, causing a low to be placed at one of the inputs of AND gate 143 and AND gate 141. A low at the input of logic inverter 145 will cause a high to be placed at one of the inputs of AND gate 147 and at one of the inputs of AND gate 149. Thus, port 1 is inhibited and port 2 is enabled. The switches of the system control unit 57 can, therefore, select through what input/output exchange the peripheral controllers and the peripheral units will communicate with each other.

To illustrate the automatic reassignment capability of the invention, assume that the peripheral control switch 105 and the peripheral unit switch 107 are both set at the 1 contact position, as shown, thereby causing number 1 peripheral controller 31 to communicate with the number 1 peripheral unit 75 through the number 1 input/output exchange 55. The signal level on exchange inhibit line 44, as a result of the switch setting, is a high; and the signal level on port select line 46 is also a high. As previously explained, a high on line 44, assuming the high is also being received on line 52 from number 2 input/output exchange 61, will cause both inputs of NOR gate 131 to be high causing its output to be low, thereby causing the output of NOR gate 133 to be low and inhibit B hub 91. The high on line 44, in the meanwhile, will enable AND gates 127 and 129, thereby enabling A hub 89. As previously explained, the high on line 47 will enable AND gates 141 and 143, and by way of logic inverter 145, inhibit AND gates 149 and 147.

Assuming now that power is lost in number 1 input/output exchange 55, the signal levels on lines 44 and 46 will both drop to a low while the signal level on line 52 will stay high, since number 2 input/output exchange 61 did not lose power. The inputs to NOR gate 131 will, therefore, be a high and a low, causing it to output a low, thereby placing a low at one of the inputs of NOR gate 133. The low on line 44 will also be placed at the other input of NOR gate 133, and at one input of AND gates 127 and 129, thereby inhibiting A port 89. With two lows at its input, NOR gate 133 has a high output that causes AND gates 139 and 137 to be enabled, thereby enabling B hub 91. Therefore, any data from number 1 peripheral controller 31, on line 119, will be forwarded to number 1 peripheral unit 75 through number 2 input/output exchange 61. As previously explained, since the signal on line 46 to port 1 is a low, because number 1 input/output exchange 55 has gone down, the output of logic inverter 145 will be high, enabling AND gates 149 and 147, causing any data from number 1 peripheral unit 75 to be transferred to number 2 input/output exchange 61, by way of number 2 port 95.

By following through the circuitry in the same manner as above, but with the peripheral control switch 105 and the peripheral unit switch 107 in the number 2 position, it can be seen that if number 2 input/output exchange 61 loses power, a low is placed on line 52, placing a low at one of the inputs of NOR gate 131 causing its output to be a low and causing one input of NOR gate 133 to also be low. A high and low input to NOR gate 133 causes its output to be low thereby disabling AND gates 139 and 137 and consequently, B hub 91. However, in such a case, the peripheral controllers, and the peripheral units that are assigned to number 2 input/output exchange 61 may be manually switched over to number 1 input/output exchange 55 by moving the wiper of their respective switches to the 1 contact position.

From the above description it can be seen that the invention provides redundant paths of communication between peripheral controllers and peripheral units and, besides providing for manual assignments of the peripheral controllers and peripheral units to certain input/output exchanges, provides for automatic reassignment of certain peripheral controllers and peripheral units when a certain one of the input/output exchanges goes down because of power failure. Obviously, many modifications and variations of the present invention are possible in light of the above teaching, It is therefore, to be understood that within the scope of the appended claims the invention may be practiced otherwise than as specifically described.

What is claimed is:

1. In a computer system, a communication network providing redundant communication paths between N peripheral controllers and M peripheral units, comprising:

a plurality of input/output exchanges connected to each of said N peripheral controllers and said M peripheral units;

means for manually assigning certain peripheral controllers and certain peripheral units to certain of said input/output exchanges; and means for automatically reassigning to another exchange the peripheral controllers and peripheral units assigned to an exchange that has experienced a power loss.

2. The communication network of claim 1 further comprising at each peripheral controller and peripheral unit, an exchange circuit for connecting its respective controller or peripheral unit to each of said plurality of input/output exchanges.

3. The communication network of claim 1 wherein each of said plurality of input/output exchanges provides an exchange inhibit signal to all said peripheral controllers and only certain selected input/output exchanges provide a port select signal to each of said peripheral units.

4. The communication network of claim 1 wherein said manually assigning means comprises, a plurality of switches, one for each peripheral controller and peripheral unit, each switch selecting either a high or a low signal level to be sent to its respective peripheral controller or peripheral unit.

5. In a computer system, a communication network providing redundant communications paths between *N* peripheral controllers and *M* peripheral units, comprising:

a pair of input/output exchanges connected to each of said N peripheral controllers and said M peripheral units, each exchange having only a certain number of peripheral controllers and peripheral units assigned to it, and means responsive to a power loss in one of said input/output exchanges for automatically reassigning to the other input/output exchange, the peripheral controllers and peripheral units assigned to the exchange that have experienced the power loss.

6. The communication network of claim 5 wherein said means partially resides within each of said pair of input/output exchanges, and provides an exchange inhibit signal to all said peripheral controllers and a port select signal to each of said peripheral units from one of said pair of input/output exchanges.

7. The communication network of claim 6 wherein a high exchange inhibit signal to a peripheral controller from a first of said pair of input/output exchanges and a high exchange inhibit signal to the same peripheral controller from a second of said pair of input/output exchanges assigns that controller to the first of said pair of input/output exchanges.

8. The communication network of claim 6 wherein a low exchange inhibit signal to a peripheral controller from a first said pair of input/output exchanges and a high exchange inhibit signal to the same peripheral controller from a second of said pair of input/output exchanges assigns that controller to the second of said pair of input/output exchanges.

9. The communication network of claim 6 wherein a high port select signal from a first input/output exchange to a peripheral unit assigns that peripheral unit to the first input/output exchange.

10. The communication network of claim 6 wherein a low port select signal from a first input/output exchange to a peripheral unit assigns that peripheral unit to a second of said pair of input/output exchanges.

11. The communication network of claim 5 further comprising: means for manually assigning certain peripheral controllers and certain peripheral units to the first or second of said pair of input/output exchanges.

12. The communication network of claim 11 wherein said manually assigning means comprises:

a plurality of switches, one switch for each N peripheral controller and one switch for each M peripheral unit, each controller related switch selecting either a high or low exchange inhibit signal level to be sent to its respective peripheral controller, each peripheral unit related switch selecting either a high or low port select signal level to be sent to its respective peripheral unit.

13. The communication network of claim 12 wherein said means for automatically reassigning partially resides within each of said first and second input/output exchanges, and provides an exchange inhibit signal to all said peripheral controllers and a port select signal to each of said peripheral units from the first input/output exchange.

14. The communication network of claim 12 wherein a high exchange inhibit signal to a peripheral controller from the first input/output exchange and a high exchange inhibit signal to the same peripheral controller from the second of said pair of input/output exchanges reassigns that controller to the first input/output exchange.

15. The communication network of claim 12 wherein a low exchange inhibit signal to a peripheral controller from the first input/output exchange and a high exchange inhibit signal to the same controller from the second input/output exchange reassign that controller to the second input/output exchange.

16. The communication network of claim 12 wherein a high port select signal from the first input/output exchange to a peripheral unit reassigns that peripheral unit to the first input/output exchange.

17. The communication network of claim 12 wherein a low port select signal from the first input/output exchange to a peripheral unit reassigns that peripheral unit to the second input/output exchange.

* * * * *